Oct. 11, 1966 H. M. GRAHAM ETAL 3,278,769
METHOD OF TEMPERATURE CYCLING FERROELECTRIC CERAMICS THROUGH
A TEMPERATURE RANGE BELOW THE CURIE POINT THEREOF
Filed July 17, 1961
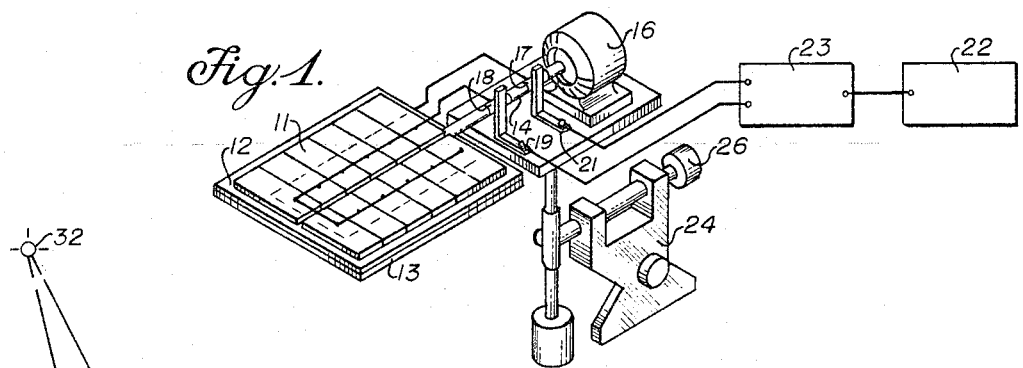
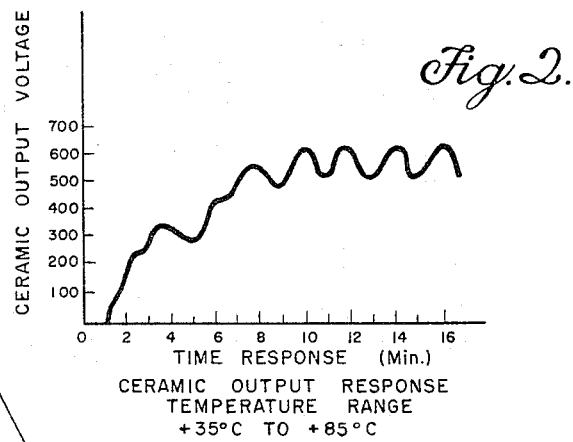
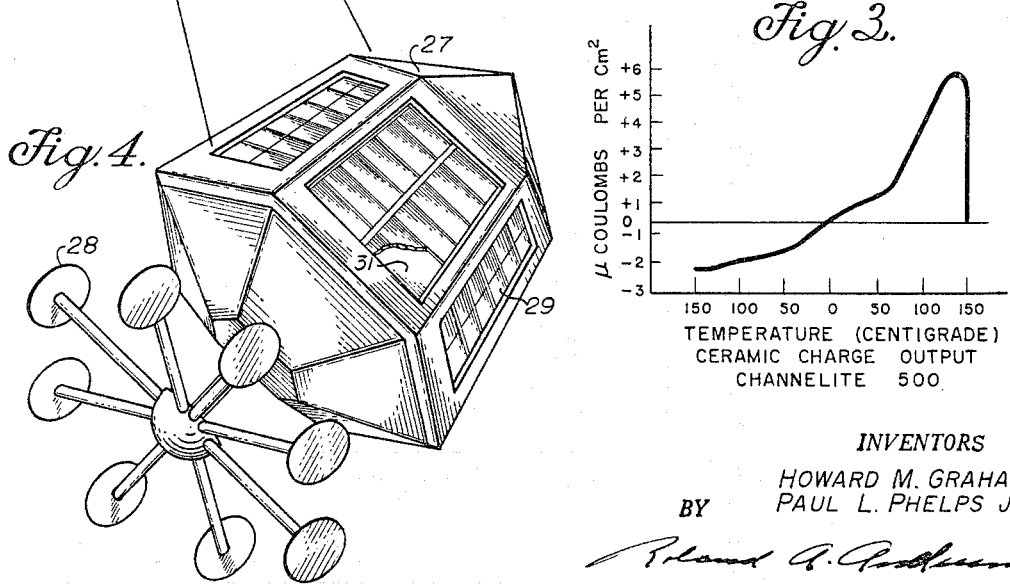
INVENTORS
HOWARD M. GRAHAM
PAUL L. PHELPS JR.
BY
ATTORNEY

United States Patent Office 3,278,769
Patented Oct. 11, 1966

3,278,769
METHOD OF TEMPERATURE CYCLING FERROELECTRIC CERAMICS THROUGH A TEMPERATURE RANGE BELOW THE CURIE POINT THEREOF
Howard M. Graham and Paul L. Phelps, Jr., Livermore, Calif., assignors to the United States of America as represented by the United States Atomic Energy Commission
Filed July 17, 1961, Ser. No. 124,740
2 Claims. (Cl. 310—4)

This invention relates to a method of, and apparatus for, obtaining electrical energy through the ferroelectric conversion of thermal energy.

Previous methods for the conversion of solar energy into useful electrical and mechanical energy have included designs for driving heat engines by steam produced in a solar collector, the use of photo-voltaic diodes commonly referred to as solar cells for generating electricity through the application of the thermionic p-n junction principle, and the use of ceramic materials in the role of solar capacitors for providing electrical power amplification.

We have discovered a novel method for obtaining a direct conversion of thermal energy into electrical energy using polarized, ferroelectric ceramics. In this method, ferroelectric crystals are polarized to contain a bound electrical charge. An energy conversion is effected by temperature-cycling the polarized ceramics within a temperature range below the Curie point of the ceramic material. Temperature-cycling the ceramics produces both positive and negative values of high electrical voltage without affecting the ceramics, their polarized state, nor their bound electrical charge in any fashion.

Accordingly, it is a primary object of the present invention to provide a method and apparatus for converting thermal energy into electrical energy by the use of ferroelectric ceramics.

It is another object of the present invention to provide a process for the direct conversion of solar energy into electrical energy.

It is another object to provide ceramic generation of electrical energy in a temperature range below the Curie point of ceramic materials.

It is still another object of the present invention to provide electrical energy in the form of alternating or direct current voltages.

It is still another object of the present invention to provide a solar energy converter which does not require auxiliary electrical batteries or power supplies.

It is yet another object of the present invention to provide a power source of electrical energy for a space vehicle.

Further objects and advantages of the present invention will be apparent from the following detailed description taken in conjunction with the accompanying drawings, in which:

FIGURE 1 is a perspective view with several components illustrated schematically of one embodiment of an energy-converter apparatus for periodically temperature-cycling ferroelectric ceramics.

FIGURE 2 is a graph of the ceramic D.C. output voltage as a function of temperatures cycling in a temperature range between 35° to 85° C.

FIGURE 3 is a graph of electrical charge as a function of temperature as obtained from a charge-bound, ferroelectric ceramic.

FIGURE 4 is a perspective view of another embodiment of the present invention illustrating the usage of charge-bound ceramics to afford the generation of electrical energy on a space vehicle.

The general steps for making a charge-bound ceramic as used in the apparatus of this invention will now be described. First, a suitable ferroelectric crystal is selected. A wide range of ferroelectric ceramics have been found suitable for use; examples of such materials are those ceramics containing lead zirconate titanate, sodium metaniobate, or barium titanate. Second, the selected ceramic is polarized by placing the same in parallel, electrical connection to a voltage source which electrically charges the ceramics. The ceramic is simultaneously heated to a temperature above the Curie point of the material. The Curie point of a ferroelectric ceramic is defined as that temperature above which such material loses its spontaneous polarization. Third, the ceramic is cooled to ambient temperatures with the applied polarizing voltage maintained across the ceramic. The operation results in a ferroelectric ceramic polarized and provided with a bound electrical charge.

We have found that commercially available, ferroelectric ceramics, such as Channelite 500, are suitable for use in the invention. Channelite 500 is a ceramic composition of barium titanate with approximately 5% lead, 12% calcium, and a trace of cobalt oxide.

In the process of this invention, ferroelectric energy conversion is obtained through a periodic cooling and heating of the aforementioned bound-charge ceramics. This cooling and heating has herein been referred to as temperature cycling. More specifically, the following are processes of the invention: In a temperature range below the Curie point of the ferroelectric ceramic material, the process of raising the temperature of the environment of a bound-charge ceramic causes a positive voltage rise to exist across the ceramic. The process of lowering the temperature results in a negative voltage across the ceramic. By alternately raising and lowering the temperature, a time alternating potential difference will be found to exist across the ceramic. Converted electrical energy is obtained in the form of an electrical potential difference, produced across the ceramic during temperature changes, through the use of electrodes positioned and connected to the surface sides of the ceramic.

In the process of this invention, a faster rate of temperature cycling produces a larger output of useful electrical energy and a wider range in temperature cycling provides higher electrical voltages. It is further noted that the ceramics due to their bound charge are self-sufficient in converting thermal energy into electrical energy, and are used without the need for auxiliary power supplies.

Ferroelectric converters of the invention may be temperature-cycled by many methods; such as, for instance, by placing electrical or mechanical heating and cooling coils in juxtaposition to the ceramics, by using a cycling liquid of varying temperature in the presence of the ceramics, or by impinging solar heat thereon. In the example given in this specification, the invention is described in a solar-energy apparatus embodiment, wherein the sun's heat impinges upon a revolving, flat plate of ferroelectric surfaces which are alternately heated and cooled.

More specifically, as shown in FIGURE 1, a set of bound-charge, ferroelectric ceramics 11 are mounted on one surface of a revolving solar collector stage 12. These ceramics are mounted one layer in thickness, side by side, to provide maximum heat absorption, and are arranged on the stage such that the upper surfaces of the ceramics are of one polarity, and the lower surfaces of the ceramics are of opposite polarity. The solar stage is constructed from thermal insulating material, for example, steatite, and a solar reflector plate or mirror 13 is mounted on the reverse surface of stage 12 to provide further insulation and reflection of impinging solar heat. Solar stage 12 is fixedly mounted to rotor shaft 14 of temperature-cycling motor 16. Motor 16 provides for the rotation of solar stage 12 during temperature cycling. Attached to rotor shaft 14 are slip rings 17 and 18 which are spaced longitudinally thereof. The upper surfaces of the polarized ceramics are electrically connected in series to slip ring 17, and the lower surfaces of the ceramics are connected in series to slip ring 18. Contact brushes 19 and 21 provide electrical contact with slip rings 17 and 18, respectively. The contact brushes are, in turn, connected to output load 22 through a rectifier circuit 23. Electric motor 16 is mounted on equatorial mount 24. The equatorial mount continuously positions solar stage 12 normal with respect to the solar heat source. Equatorial mount 24 is driven by conventional driving mechanism 26 coupled thereto.

In operation, the charge-bound ceramics are mounted on solar stage 12. The solar stage is positionally directed toward the sun in order that the solar heat will impinge upon the ceramics. The solar stage is mounted on rotor shaft 14 of motor 16 which provides a continuous rotational motion of the solar stage during ceramic temperature cycling; that is, a half cycle rotation of rotor shaft 14 rotates the ceramics toward the solar rays for heating, while in the next half cycle, the ceramics are rotated away from the sun and shielded from the solar heat by reflector plate 13 which acts to insulate the ceramics during this half of the cycle. Temperature cycling the ferroelectric ceramics enables a continuous voltage to be discharged through slip rings 17 and 18, brushes 19 and 21, into rectifier circuit 23 and into output load 22.

As an example of an embodiment of the invention, a set of ceramics of barium titanate composition, as previously described, was charge bound by temperature raising the ceramics above the Curie point at a voltage of 25–35 volts per mil of ceramic thickness, and allowing the ceramics to cool with the voltage maintained thereon. The dimensions of the ceramics were 1″ x 2½″ x ⅛″. A set of twelve ceramics having an effective surface area of 30 square inches was mounted on the surface of a rotating solar stage at a distance of 6″ from an artificial light source comprising a 275-watt, infrared lamp. Shown in FIGURE 2 is a graph of the ceramic output voltage as a function of temperature cycling with the light source. The temperature range, during cycling, was 35° to 85° C., which converted the thermal energy of the artificial light source into a rectified electrical output voltage of 600 volts D.C.

The charge output in microcoulombs per square centimeter as a function of temperature in degrees centigrade is shown in FIGURE 3.

The use of the above-mentioned apparatus in natural sunlight gave an average output voltage of 200–300 volts across a 100-megohm load and an output charge of 10–12 microcoulombs per square centimeter.

It is to be noted that without the use of a rectifier circuit, as in the above example, temperature cycling produces an A.C. voltage; that is, during heating, positive voltages are obtained and during cooling, negative voltages are obtained from the ceramics.

Another application of this invention illustrates an economical method for the generation of electrical energy in a space vehicle tumbling in space. A slowly tumbling space vehicle provides a self-temperature cycling process for the charge-bound ceramics. That is, due to the sun's heat being periodically incident upon a flat of ceramics affixed to the surface of a slowly revolving space vehicle, the ceramics are cyclically heated and cooled, thus providing for the generation of electrical energy by the simplest apparatus now possible. An embodiment of this application of charge-bound ceramics is illustrated in FIGURE 4.

More specifically, in FIGURE 4 there is shown a space vehicle 27 rotating in space. A stabilizer 28 stabilizes the path of flight. A plurality of bound-charge ceramics 29 are mounted on insulation plates 31 affixed on the surface of vehicle 27. The vehicle, as illustrated, revolves on an axis normal to the direction of the solar heat coming from the sun at point 32. The affixed ceramics 29, mounted on plates 31, circumscribe the vehicle concentrically with the longitudinal axis of rotation. The ceramics slowly revolve toward and away from the heat of the sun as the vehicle rotates. The cycling results in the generation of electrical energy for use as a power source within the vehicle.

In general, this invention constitutes a self-contained high-voltage, low-current energy source. While this invention has been described with respect to but a few embodiments, it will be appreciated that numerous modifications and variations are possible within the spirit and scope of this invention, and thus it is not intended to limit the invention except by the terms of the following claims.

What is claimed is:

1. In a process for the direct conversion of thermal energy into electrical energy the steps comprising temperature cycling a plurality of polarized bound-charge ferroelectric ceramics through a range of temperatures below the Curie point thereof to generate an alternating potential difference on the ceramics, and conducting the generated electrical energy away from said ceramics by electrical means.

2. In a process for the direct conversion of thermal energy into electrical energy the steps comprising temperature cycling a plurality of polarized bound-charge ferroelectric ceramics through a range of temperatures below the Curie point thereof to generate an alternating potential difference on the ceramics, conducting the generated electrical energy away from said ceramics, and rectifying the alternating potential difference into direct current voltage.

References Cited by the Examiner

UNITED STATES PATENTS

| | | | |
|---|---|---|---|
| 476,983 | 6/1892 | Edison | 310—4 |
| 2,299,260 | 10/1942 | Sivian | 250—239 X |
| 2,391,313 | 12/1945 | Hindle | 310—4 |
| 3,009,093 | 11/1961 | Seire | 321—2 X |
| 3,147,390 | 9/1964 | Beam | 310—4 |
| 3,149,246 | 9/1964 | Mason | 310—4 |
| 3,198,969 | 8/1965 | Kolm | 310—4 |

MILTON O. HIRSHFIELD, *Primary Examiner.*

ORIS L. RADER, *Examiner.*

J. A. HINKLE, J. W. GIBBS, *Assistant Examiners.*